(12) United States Patent
Torresani et al.

(10) Patent No.: US 11,131,074 B2
(45) Date of Patent: Sep. 28, 2021

(54) VERTICAL MANHOLE APPARATUS AND METHOD FOR PROVIDING ACCESS TO LEACHATE COLLECTION PIPES IN A LANDFILL

(71) Applicant: TETRA TECH, INC., Pasadena, CA (US)

(72) Inventors: Mark Torresani, Middleton, WI (US); Kyle Kneser, Oostburg, WI (US)

(73) Assignee: Tetra Tech, Inc., Pasadena, CA (US)

( * ) Notice: Subject to any disclaimer, the term of this patent is extended or adjusted under 35 U.S.C. 154(b) by 0 days.

(21) Appl. No.: 16/893,639

(22) Filed: Jun. 5, 2020

(65) Prior Publication Data
US 2020/0332490 A1 Oct. 22, 2020

Related U.S. Application Data

(63) Continuation of application No. 16/163,027, filed on Oct. 17, 2018, now Pat. No. 10,753,062.

(60) Provisional application No. 62/573,822, filed on Oct. 18, 2017.

(51) Int. Cl.
*E02D 29/02* (2006.01)
*E02D 29/12* (2006.01)
*E02D 29/14* (2006.01)
*B09B 1/00* (2006.01)

(52) U.S. Cl.
CPC ............ *E02D 29/121* (2013.01); *B09B 1/006* (2013.01); *E02D 29/1418* (2013.01); *E02D 29/1445* (2013.01); *E02D 29/0225* (2013.01); *E02D 29/0233* (2013.01); *E02D 29/0241* (2013.01)

(58) Field of Classification Search
CPC .. E03F 5/02; E03F 2005/028; E02D 29/0225; E02D 29/0233; E02D 29/0241; E02D 29/121; E02D 29/141; E02D 5/80; E02D 5/801; B09B 1/006
See application file for complete search history.

(56) References Cited

U.S. PATENT DOCUMENTS

| | | | | |
|---|---|---|---|---|
| 1,245,176 | A | * | 11/1917 | Beard ...................... E02D 5/803 52/163 |
| 4,074,481 | A | * | 2/1978 | Lang ......................... E02D 5/74 52/169.8 |
| 4,127,990 | A | * | 12/1978 | Morrow ................... E02D 29/12 264/32 |
| 4,189,891 | A | * | 2/1980 | Johnson .................... E02D 5/74 52/741.13 |

(Continued)

FOREIGN PATENT DOCUMENTS

| | | |
|---|---|---|
| CN | 100526571 C | 8/2009 |
| CN | 205782971 | 12/2016 |

(Continued)

OTHER PUBLICATIONS

International Search Report and Written Opinion of the International Searching Authority, International Application No. PCT/US18/56246 (dated Dec. 28, 2018).

*Primary Examiner* — Adriana Figueroa
(74) *Attorney, Agent, or Firm* — Robinson IP Law, PLLC

(57) ABSTRACT

A vertical manhole apparatus for use in a waste facility to provide access to one or more leachate collection pipe access points. The vertical manhole is stabilized using stabilizing features extending out from a vertical pipe of the vertical manhole apparatus.

9 Claims, 15 Drawing Sheets

(56) References Cited

U.S. PATENT DOCUMENTS

| | | | | |
|---|---|---|---|---|
| 4,275,757 A * | 6/1981 | Singer | ............ | E02D 29/12 |
| | | | | 137/363 |
| 4,480,945 A * | 11/1984 | Schnabel, Jr. | ...... | E02D 29/0233 |
| | | | | 405/259.5 |
| 4,674,921 A * | 6/1987 | Berger | ............ | E02B 3/066 |
| | | | | 405/262 |
| 4,717,285 A * | 1/1988 | Pulkkinen | ............ | E04H 7/20 |
| | | | | 405/55 |
| 4,970,835 A * | 11/1990 | Harmon | ............ | E02D 5/76 |
| | | | | 521/62 |
| 5,092,709 A * | 3/1992 | Davis | ............ | E02B 11/00 |
| | | | | 405/129.7 |
| 5,207,038 A * | 5/1993 | Negri | ............ | E02D 29/0241 |
| | | | | 405/149 |
| 5,368,414 A * | 11/1994 | Miller | ............ | E02B 3/066 |
| | | | | 405/262 |
| 5,533,839 A * | 7/1996 | Shimada | ............ | E02D 29/02 |
| | | | | 405/286 |
| 5,542,780 A * | 8/1996 | Kourgli | ............ | E02D 29/12 |
| | | | | 405/53 |
| 6,135,141 A * | 10/2000 | Bombach | ............ | E03F 5/02 |
| | | | | 137/363 |
| 6,401,759 B1 * | 6/2002 | Kamiyama | ............ | B29C 63/36 |
| | | | | 138/98 |
| 6,427,417 B1 * | 8/2002 | Sagy | ............ | E02D 5/74 |
| | | | | 405/262 |
| 6,599,058 B1 * | 7/2003 | Arnold | ............ | B09B 1/00 |
| | | | | 210/170.07 |
| 6,644,342 B1 * | 11/2003 | Bogan | ............ | E02D 29/121 |
| | | | | 137/364 |
| 6,769,222 B2 * | 8/2004 | Billante | ............ | E02D 35/00 |
| | | | | 52/741.15 |
| 7,114,887 B1 * | 10/2006 | Rainey | ............ | E02D 29/0233 |
| | | | | 405/262 |
| 8,375,671 B1 * | 2/2013 | Thrasher | ............ | E02D 31/10 |
| | | | | 52/514 |
| 9,556,579 B2 | 1/2017 | Ahlberg et al. | | |
| 9,732,492 B2 | 8/2017 | Ahlberg et al. | | |
| 10,214,893 B2 * | 2/2019 | Skinner | ............ | B28B 19/0046 |
| 2002/0168154 A1 | 11/2002 | Mayr et al. | | |
| 2003/0143029 A1 * | 7/2003 | Lockwood | ............ | E02D 29/05 |
| | | | | 405/125 |
| 2004/0163341 A1 * | 8/2004 | Gregory | ............ | E02D 37/00 |
| | | | | 52/294 |
| 2007/0168154 A1 | 7/2007 | Ericson | | |
| 2009/0142145 A1 * | 6/2009 | Martin | ............ | E02D 29/0241 |
| | | | | 405/303 |
| 2010/0058680 A1 * | 3/2010 | Agg | ............ | E02D 5/80 |
| | | | | 52/163 |
| 2014/0003869 A1 * | 1/2014 | Freitag | ............ | E04C 5/12 |
| | | | | 405/262 |
| 2017/0120314 A1 | 5/2017 | Zapata | | |
| 2017/0121925 A1 | 5/2017 | Ahlberg et al. | | |

FOREIGN PATENT DOCUMENTS

| | | | | |
|---|---|---|---|---|
| DE | 3609973 A1 | 10/1986 | | |
| DE | 3631686 A1 * | 4/1988 | ............ | E02D 29/12 |
| DE | 4312267 A1 * | 10/1993 | ............ | B09B 1/006 |
| DE | 4417265 C1 * | 8/1995 | | |
| DE | 3929530 C2 | 12/1999 | | |
| KR | 200225565 Y1 | 3/2001 | | |
| KR | 100703594 | 4/2007 | | |

* cited by examiner

VERTICAL MANHOLE APPARATUS AND METHOD FOR PROVIDING ACCESS TO LEACHATE COLLECTION PIPES IN A LANDFILL

PRIORITY

This application is a continuation of and claims priority to pending U.S. Nonprovisional patent application Ser. No. 16/163,027 entitled "Vertical Manhole Apparatus and Method for Providing Access to Leachate Collection Pipes in a Landfill" which was filed on Oct. 17, 2018 which claims priority to U.S. Provisional Patent Application Ser. No. 62/573,822 entitled "Waste Stabilized Vertical Manhole" which was filed on Oct. 18, 2017, the contents of which are incorporated herein by reference.

FIELD

This disclosure relates to the field of waste disposal. More particularly, this disclosure relates to a vertical manhole apparatus for use in a landfill to access leachate collection pipes.

BACKGROUND

Landfills that have been expanded multiple times over a period of decades are limited in future volume expansions by previously designed leachate collection systems. Extending leachate cleanout and access pipes vertically from the base of a landfill as waste is placed in the landfill has proven difficult. This is because waste that is placed in a landfill decomposes at different rates throughout the landfill and is not stable from a geotechnical perspective. In non-landfill applications above ground, a vertical pipe is often stabilized by a strong foundation and compacted backfill and is designed to withstand horizontal loads. However, designing a strong foundation for a vertical riser is not practical in a landfill due to technical and regulatory constraints.

Landfills, often divided into separate cells, are currently designed with a clay and geosynthetic base liner and a liquid collection system at the base of each cell. The liner materials are not permitted to be penetrated in order to prevent liquid from leaking out of the landfill. Environmental regulations require that landfills maintain less than a one-foot depth of liquid head on the liner and that the collection pipes be limited in length for cleaning purposes, typically less than 2000 feet in length. With limited success, landfill owners and engineers have attempted to bring collection pipes to the surface with different manhole configurations. However, these manholes have typically failed over time due to the large differential settlements seen in landfills. This differential settlement results in horizontal and vertical forces causing pipes or manholes to tilt or shear. Once a manhole in a waste mass starts to lean, a downward vertical force acts on the manhole with little upward resistance because the waste cannot support the weight of the manhole.

Most landfills currently do not overlay waste over leachate collection pipe access points (leachate side slope risers on the perimeter of the landfill) due to concerns over environmental compliance issues caused by the possibility of a failed leachate collection system. Not being able to expand the size (length and/or width) of the landfill reduces the value of the site and requires new areas to be developed as landfills.

What is needed, therefore, is an apparatus in a landfill wherein waste of the landfill can be overlaid above one or more leachate collection pipe access points so that the length and/or width of the landfill can be extended, reducing the need for opening new landfills.

SUMMARY

The above and other needs are met by a vertical manhole apparatus which provides access to a leachate collection pipe access point so that waste can be overlaid above such access point, thereby allowing for the expansion of the size of the landfill. Such apparatus will preferably include further features to help to stabilize the horizontal forces that cause vertical pipes and manholes to fail in a landfill wherein such apparatus will help to counter vertical and/or horizontal forces if a vertical manhole starts to lean. Such features include a vertical pipe including segments of pipe that extend vertically above a foundation of the vertical manhole apparatus. In some embodiments, further features include cables which have deadman anchors attached at distal ends of the cables wherein the anchors are fixed within masses of waste in the landfill. At their proximal ends, the cables are preferably connected to a tension control system located proximate to the top of the vertical manhole apparatus wherein the cables extend into and up the vertical pipe to the tension control system. In an alternative embodiment without a tension control system, the proximal ends of the cables are attached to the vertical pipe directly and do not extend up the vertical pipe.

In one embodiment, a vertical manhole apparatus is disclosed for providing access to one or more leachate collection pipe access points. The apparatus includes a plurality of pipe segments joined together vertically above a foundation in a landfill wherein the plurality of pipe segments form a vertical pipe and wherein a first pipe segment includes a first aperture of the first pipe segment extending through a wall of the first pipe segment; a first cable extending through the first aperture of the first pipe segment; a first deadman anchor connected to a first end of the first cable and located in a first mass of waste in the landfill; and a tension control system wherein a second end of the first cable is connected to the tension control system and wherein the tension control system controls the tension of the first cable by increasing or decreasing the tension of the first cable between the tension control system and the first deadman anchor. The vertical manhole apparatus preferably includes a protective sleeve surrounding at least a portion of the first cable. In one embodiment, the protective sleeve further includes a first protective sleeve member and a second protective sleeve member wherein the first protective sleeve member is narrower that the second protective sleeve member such that the first protective sleeve member is configured to slide at least partially inside of the second protective sleeve member.

Preferably, the vertical manhole apparatus described above includes at least three apertures extending through the wall of the first pipe segment, the at least three apertures comprising the first aperture of the first pipe segment, a second aperture of the first pipe segment, and a third aperture of the first pipe segment; a second deadman anchor; a second cable extending through the second aperture of the first pipe segment wherein a first end of the second cable is connected to the second deadman anchor which is located in a second mass of waste in the landfill and wherein a second end of the second cable is connected to the tension control system; a third deadman anchor; a third cable extending through the third aperture of the first pipe segment wherein a first end of the third cable is connected to the third deadman anchor which is located in a third mass of waste in the landfill and wherein a second end of the third cable is connected to the tension control system; and the tension control system for controlling the tension of the second cable by increasing or decreasing the tension between the second deadman anchor and the tension control system and for controlling the tension of the third cable by increasing or decreasing the tension between the third deadman anchor and the tension control system. In one embodiment, the vertical manhole apparatus further includes a first cable roller attached adjacent to the first aperture of the first pipe segment wherein the first cable roller is provided to allow the first cable to roll or slide easily along the first cable roller as the tension of the first cable is controlled by the tension control system; a second cable roller attached adjacent to the second aperture of the first pipe segment wherein the second cable roller is provided to allow the second cable to roll or slide easily along the second cable roller as the tension of the second cable is controlled by the tension control system; and a third cable roller attached adjacent to the third aperture of the first pipe segment wherein the third cable roller is provided to allow the third cable to roll or slide easily along the third cable roller as the tension of the third cable is controlled by the tension control system. In certain embodiments, the tension control system includes one or more winches. If more than one winch is used, such winches can be independently controlled. More specifically, the tension control system may include a first cable winch connected to the first cable, a second cable winch connected to the second cable, and a third cable winch connected to the third cable.

The first aperture of the first pipe segment, the second aperture of the first pipe segment, and the third aperture of the first pipe segment are separated from one another along the wall of the first pipe segment by approximately 120 degrees.

Embodiments of the vertical manhole apparatus described above preferably further include a cleanout riser pipe extending adjacent to the vertical pipe from a cleanout riser pipe access point to a collection pipe access point proximate a leachate collection pipe.

Embodiments of the vertical manhole apparatus may further include a vertical manhole apparatus wherein the plurality of pipe segments further include a second pipe segment which includes at least one aperture extending through the wall of the second pipe segment, the at least one aperture including a first aperture of the second pipe segment; a fourth deadman anchor; a fourth cable extending through the first aperture of the second pipe segment wherein a first end of the fourth cable is connected to the fourth deadman anchor which is located in a fourth mass of waste in the landfill and wherein a second end of the fourth cable is connected to the tension control system; and the tension control system for controlling the tension of the fourth cable by increasing or decreasing the tension between the fourth deadman anchor and the tension control system.

In a further exemplary embodiment, the vertical manhole apparatus may further include a vertical manhole apparatus wherein the second pipe segment further comprising at least three apertures extending through the wall of the second pipe segment, the at least three apertures including the first aperture of the second pipe segment, a second aperture of the second pipe segment, and a third aperture of the second pipe segment; a fifth deadman anchor; a fifth cable extending through the second aperture of the second pipe segment wherein a first end of the fifth cable is connected to the fifth deadman anchor which is located in a fifth mass of waste in the landfill and wherein a second end of the fifth cable is connected to the tension control system; a sixth deadman anchor; a sixth cable extending through the third aperture of the second pipe segment wherein a first end of the sixth cable is connected to the sixth deadman anchor which is located in a sixth mass of waste in the landfill and wherein a second end of the sixth cable is connected to the tension control system; and the tension control system for controlling the tension of the fifth cable by increasing or decreasing the tension between the fifth deadman anchor and the tension control system and for controlling the tension of the sixth cable by increasing or decreasing the tension between the sixth deadman anchor and the tension control system.

In one embodiment, the first aperture of the first pipe segment is offset from the first aperture of the second pipe segment by approximately 60 degrees.

In another aspect, a vertical manhole apparatus is disclosed which includes a plurality of first pipe segments joined together vertically above a foundation in a landfill including a first pipe first segment wherein the plurality of first pipe segments form a first vertical pipe; a cleanout riser pipe extending inside the first vertical pipe from a cleanout riser pipe access point to a collection pipe access point proximate a leachate collection pipe; and a first stabilizer engaged with the first pipe first segment and extending from the first pipe first segment out into waste in the landfill. In one embodiment, the vertical manhole apparatus further includes a tension control system wherein the first stabilizer further includes a first cable connected to a first deadman anchor at a proximal end of the first cable and the tension control system at a distal end of the first cable and wherein the tension control system controls the tension of the first cable by increasing or decreasing the tension of the first cable between the tension control system and the first deadman anchor.

The vertical manhole apparatus preferably further includes a second stabilizer engaged with the first pipe first segment and extending from the first pipe first segment; and a third stabilizer engaged with the first pipe first segment and extending from the first pipe first segment. In a related embodiment, the vertical manhole apparatus further includes a tension control system wherein (a) the first stabilizer further comprises a first cable connected to a first deadman anchor at a proximal end of the first cable and the tension control system at a distal end of the first cable, (b) the second stabilizer further comprises a second cable connected to a second deadman anchor at a proximal end of the second cable and the tension control system at a distal end of the second cable, and (c) the third stabilizer further comprises a third cable connected to a third deadman anchor at a proximal end of the first cable and the tension control system at a distal end of the first cable and wherein (1) the tension control system controls the tension of the first cable by increasing or decreasing the tension of the first cable between the tension control system and the first deadman anchor, (2) the tension control system controls the tension of the second cable by increasing or decreasing the tension of the second cable between the tension control system and the second deadman anchor, and (3) the tension control system controls the tension of the third cable by increasing or decreasing the tension of the third cable between the tension control system and the third deadman anchor. In a related embodiment, the tension control system further includes a winch located adjacent to an edge of waste from the landfill. In a related embodiment, the tension control system further includes a plurality of winches located adjacent to an edge of waste from the landfill.

In a different related embodiment, the tension control system further includes a first winch located inside the first vertical pipe adjacent to an aperture in the first vertical pipe through which the first cable extends. The vertical manhole apparatus may further include a control device for controlling the first winch wherein the control device is in communication with the first winch but wherein the control device is remote from the first winch.

In one embodiment the tension control system further includes a first winch, a second winch, and a third winch and wherein the first winch is located inside the first vertical pipe adjacent to a first aperture in the first vertical pipe through which the first cable extends, wherein the second winch is located inside the first vertical pipe adjacent to a second aperture in the first vertical pipe through which the second cable extends, and wherein the third winch is located inside the first vertical pipe adjacent to a third aperture in the first vertical pipe through which the third cable extends.

In one embodiment the first stabilizer includes a first rod connected to the first pipe first segment. In a related embodiment, the first stabilizer further includes a first rod connected to the first pipe first segment, the second stabilizer further includes a second rod connected to the first pipe first segment, and the third stabilizer further includes a third rod connected to the first pipe first segment. In one embodiment, the first stabilizer further includes a first deadman anchor connected to the first rod. In one embodiment, the vertical manhole apparatus further includes a first motor attached adjacent to the vertical pipe and engaged with the first rod for adjusting the depth at which the first rod extends away from the vertical pipe, a second motor attached adjacent to the vertical pipe and engaged with the second rod for adjusting the depth at which the second rod extends away from the vertical pipe, and a third motor attached adjacent to the vertical pipe and engaged with the third rod for adjusting the depth at which the third rod extends away from the vertical pipe. In a related embodiment, the first stabilizer further includes a first deadman anchor connected to the first rod, the second stabilizer further includes a second deadman anchor connected to the second rod, and the third stabilizer further includes a third deadman anchor connected to the third rod.

In one embodiment, the first stabilizer further includes a first cable connected to the first rod and a first deadman anchor connected to the first cable. In a related embodiment, the first stabilizer further includes a first cable connected to the first rod and a first deadman anchor connected to the first cable; the second stabilizer further includes a second cable connected to the second rod and a second deadman anchor connected to the second cable; and the third stabilizer further includes a third cable connected to the third rod and a third deadman anchor connected to the third cable.

In one embodiment, the vertical manhole apparatus includes a plurality of second pipe segments joined together vertically above the foundation in the landfill wherein the plurality of second pipe segments form a second vertical pipe located inside the first vertical pipe with space between the first vertical pipe and the second vertical pipe and wherein the cleanout riser pipe extends inside the second vertical pipe from the cleanout riser pipe access point to the collection pipe access point proximate the leachate collection pipe.

In a different embodiment, the first stabilizer further includes a geomat. In one related embodiment, the geomat further includes an aperture that fits closely around the first vertical pipe. In a related embodiment, the geomat further includes an aperture that fits around the first vertical pipe and the vertical manhole is configured so that that geomat is slidably engaged along the vertical pipe. In a related embodiment, the first stabilizer further includes a first geomat, the second stabilizer further includes a second geomat, and the third stabilizer further includes a third geomat.

In addition to embodiments of a vertical manhole apparatus a method of adjusting the orientation of a vertical manhole apparatus for providing access to one or more leachate collection pipe access points in a landfill is also disclosed. The method preferably includes the steps of (i) engaging a first stabilizer with a vertical pipe which forms part of a vertical manhole apparatus located in the landfill wherein at least a portion of the first stabilizer operates as a deadman anchor located in waste inside the landfill; and (ii) adjusting the first stabilizer using a tension control system in order to pull on the vertical pipe and thereby adjust the orientation of the vertical pipe relative to surrounding waste inside the landfill. The method preferably further includes the steps of (iii) engaging a second stabilizer with the vertical pipe wherein at least a portion of the second stabilizer operates as a deadman anchor located in waste inside the landfill; (iv) engaging a third stabilizer with the vertical pipe wherein at least a portion of the third stabilizer operates as a deadman anchor located in waste inside the landfill; and (v) adjusting the first stabilizer, the second stabilizer and the third stabilizer using a tension control system in order to pull on the vertical pipe and thereby adjust the orientation of the vertical pipe relative to surrounding waste inside the landfill.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale to more clearly show the details, wherein like reference numbers indicate like elements throughout the several views, and wherein:

DETAILED DESCRIPTION

Figure 1:
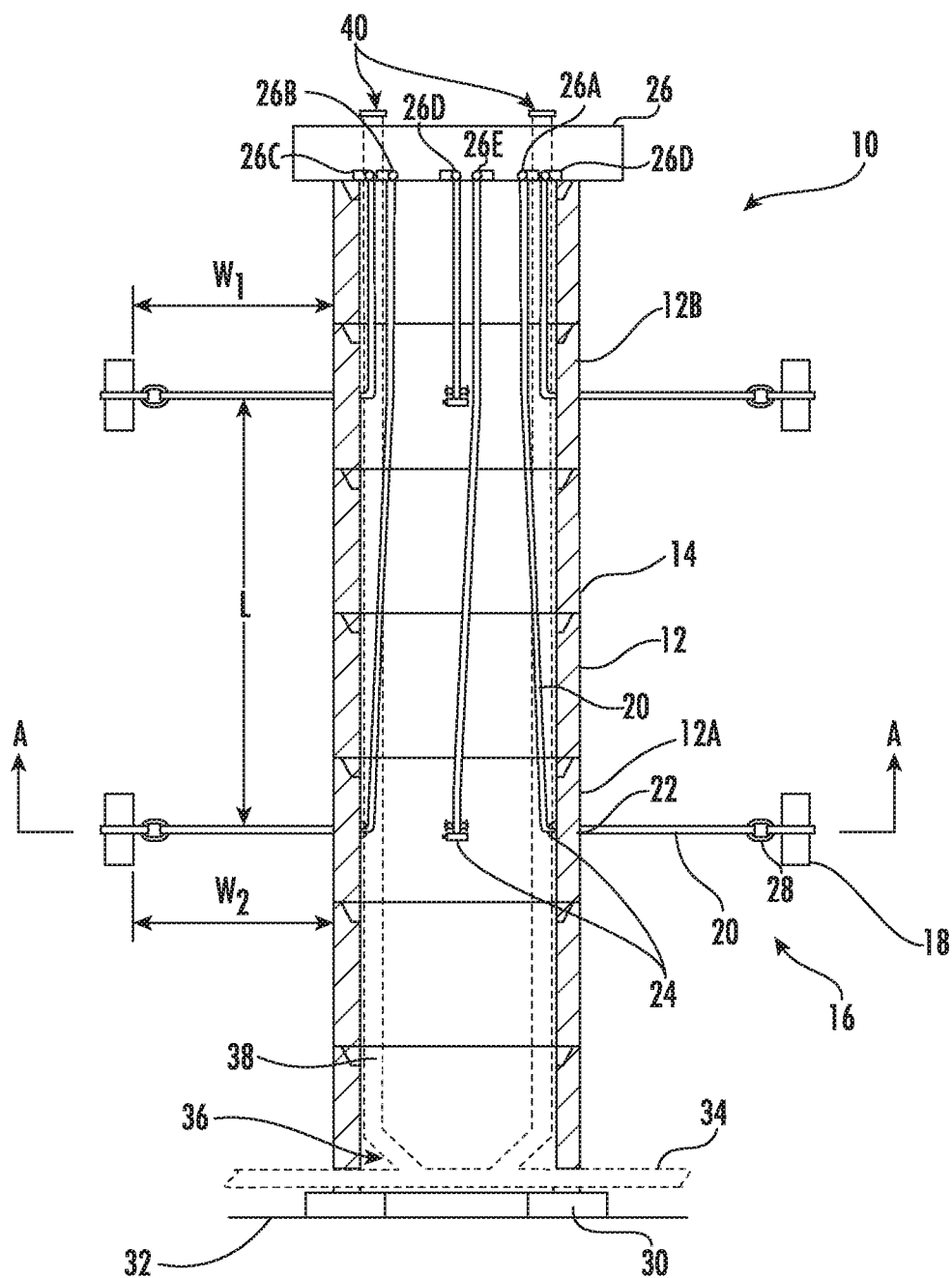
FIG. 1 shows a cutaway profile view of an embodiment of a vertical manhole apparatus as described herein including a vertical pipe including a plurality of pipe segments and adjustable stabilizers.
Figure 2:
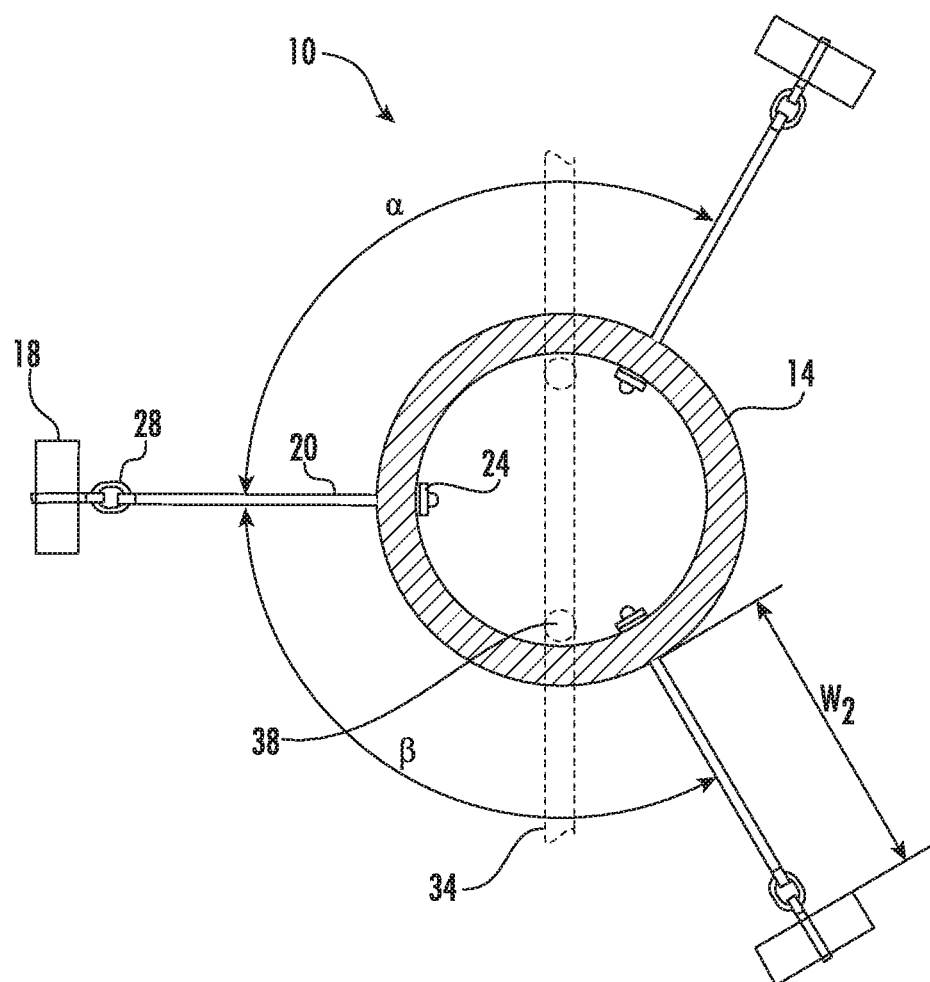
FIG. 2 shows a plan view of the embodiment of the vertical manhole apparatus shown in FIG. 1 at a location shown by line A-A in FIG. 1 along the vertical pipe below a tension control system.

FIG. 1 shows a cutaway profile view of a vertical manhole apparatus 10 for use in a landfill to provide access to a leachate collection pipe access point. FIG. 2 shows a top plan view of the apparatus shown in FIG. 1 cut at line A-A. The manhole apparatus 10 operates as a leachate riser/cleanout extension so that waste can be placed vertically above a leachate collection pipe access point, thereby expanding the width and/or length of a landfill. The manhole apparatus 10 is constructed in segments 12 stacked on top of one another as shown in FIG. 1 to form a vertical pipe 14. The term "segments" is defined herein to refer to sections of the vertical pipe 14. In one embodiment, the segments 12 are made of concrete, but such segments can also be made of other materials such as metal or metal alloy (e.g., steel), fiberglass, or other building material known to persons having ordinary skill in the art and which are used for the same or similar structures.

Construction of the segments 12 will also include the positioning of adjustable stabilizers 16 (including deadman anchors 18 attached to cables 20) to prevent segments 12 from pulling apart. More specifically, a series of deadman anchors 18 (poles, pipes, geosynthetic mesh or other material) connected by cables 20 will physically engage with a large mass of waste to help stabilize the vertical pipe 14 and hold the pipe 14 in place. The connecting cables 20 extend through apertures 22 in a particular segment 12A and are preferably adjustable in length which will allow a landfill operator to adjust the vertical alignment of the vertical pipe 14 over time and resist the shear forces on the vertical pipe 14 caused by differential settlement within the waste mass in the landfill. Each aperture 22 preferably includes a cable roller 24 or other similar feature adjacent thereto on which cables 20 can slide or roll. Cables 20 which are pulled along such cable rollers 24 or other similar devices along the vertical pipe 14 are said to be "engaged with" the vertical pipe 14 even though such cables 20 may not be attached directly to or otherwise connected directly to the vertical pipe 14.

The cables 20 are preferably drawn to a cable tension control system 26 which preferably includes a winch (e.g., 20,000 lb. min.) or other similar device known to persons having ordinary skill in the art for tightening or loosening the cables 20. More than one winch may be employed as shown in FIG. 1 showing the cable tension control system 26 including a first winch 26A, a second winch 26B, a third winch 26C, a fourth winch 26D, a fifth winch 26E, and a sixth winch 26F wherein each winch can be independently controlled to pull different cables to different lengths which affects tension along each of the cables. The winches may be manual (non-motorized) winches or motorized winches.

The adjustable stabilizers 16 (or "stabilizers"), due to their geometry, will also exert a vertical force on the vertical pipe 14 preventing the segments 12 from separating from vertical tension forces. The connecting cables 20 preferably radiate from the vertical pipe 14 at angles α and β (preferably at about 120° each) as shown in FIG. 2 and will be attached at multiple heights on the vertical pipe 14 on different segments 12 as shown in FIG. 1. For cables 20 extending through a different (higher or lower) segment 12 (e.g., segment 12B), such cables 20 are preferably horizontally offset from the cables above and/or below (e.g., by 60°). In embodiments employing multiple groups of cables at different elevations, the vertical distance(s) "L" between sets of cables 20 along the vertical pipe 14 can range from about 2 meters to about 6 meters. Such distances may be uniform along the vertical pipe 14 or my increase or decrease between groups of cables depending on the specific elevation of the groups of cables 20 along the vertical pipe 14. The distance $W_1$ and $W_2$ at which deadman anchors are separated from the vertical pipe 14 may range from about one foot to many feet such as 10 feet, 20 feet or more depending on the embodiment.

The cables 20 are connected to the deadman anchors 18 by connectors 28 such as, for example, eye to eye swivel connectors. Although a specific type of connector is mentioned herein, persons having ordinary skill in the art will appreciate that various other mechanical connectors are available for use and this disclosure is not intended to be limited by a particular type of connector to connect cables 20 (or other structures) to deadman anchors 18 for this or any other embodiment described herein. The specific configuration of the vertical pipe 14, cables 20 and deadman anchors 18 may, in some cases, require a geotechnical and structural analysis. The vertical pipe 14 rests vertically on a foundation 30 typically made from concrete resting on the landfill base 32 (e.g., liner materials) but not penetrating the liner materials. Buffer materials can be laced between the base structure and the liner to prevent liner penetration or damage. The manhole apparatus 10 provides vertical access to a leachate collection pipe 34 via a leachate collection pipe access point 36 at a location where the leachate collection pipe 34 is connected to one or more cleanout riser pipes 38 that extend up through or adjacent to the vertical pipe 14 to a cleanout riser pipe access point 40. The leachate collection pipe 34 and the cleanout riser pipes 38 are shown in broken lines in FIG. 1 and FIG. 2.

The vertical manhole apparatus 10 has many advantages including its ability to resist much greater horizontal shear and vertical tension forces than the previously utilized manholes and pipes in landfills which do not include features described herein. This stability is accomplished by utilizing the adjustable stabilizers 16 (cables 20 and anchors 18) that will allow adjustments over an extended period of time, keeping the vertical pipe 14 intact and operational throughout the life of the overall collection system of the landfill. The vertical manhole apparatus 10 will allow landfills to utilize waste disposal capacity that is currently unusable in areas that cannot be filled because of the need to access the cell drainage systems. The vertical manhole apparatus 10 will provide a stable, reliable way to extend leachate collection lines vertically within a landfill and will also allow landfill cells to be developed and constructed in new geometric shapes that can maximize volume by removing the typical leachate line limit of approximately 2000 feet.

Figure 3:
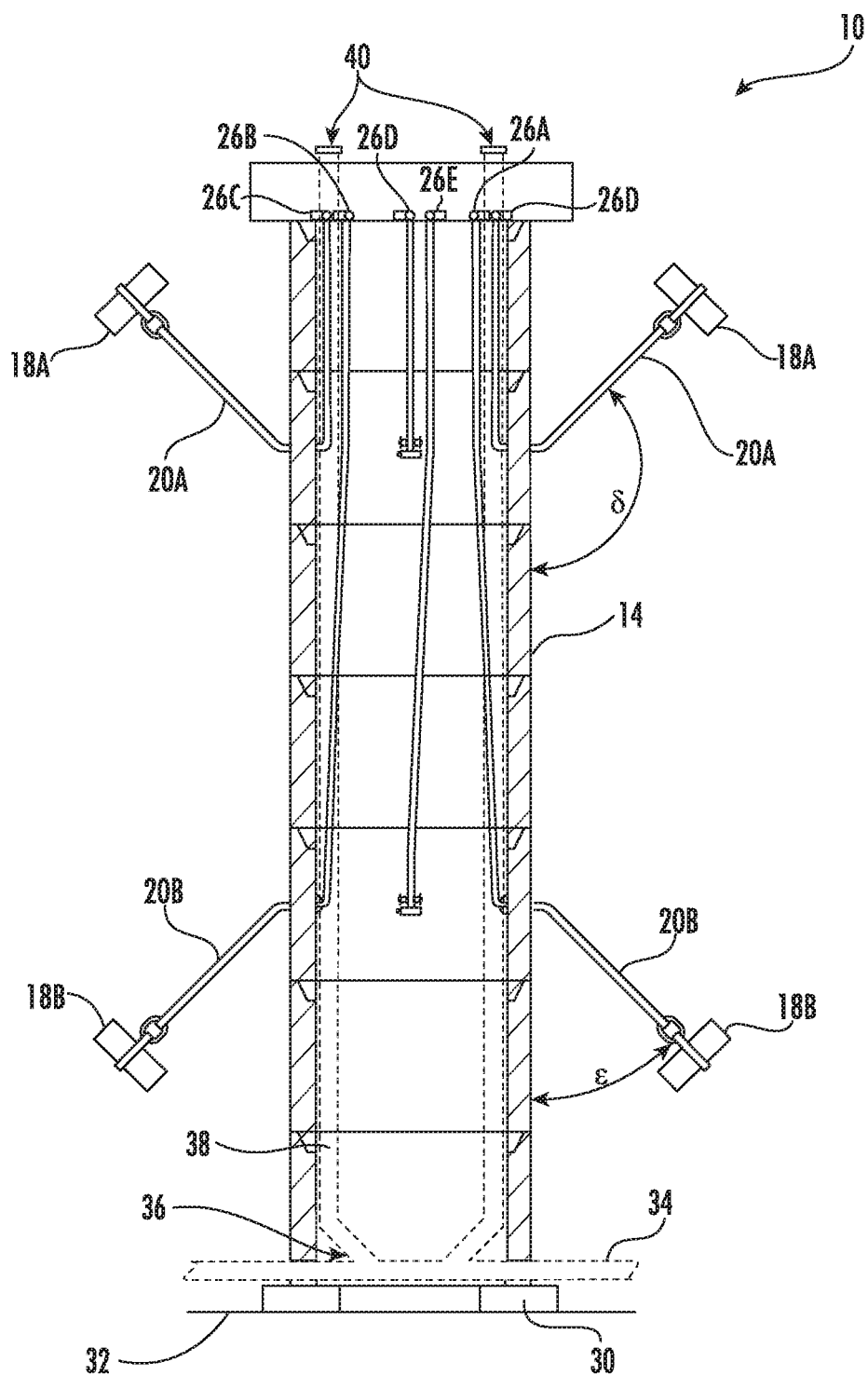
FIG. 3 shows a cutaway profile view of an embodiment of a vertical manhole apparatus that is a variation of the apparatus shown in FIG. 1 wherein the variation includes adjustable stabilizers oriented at angles other than horizontal in the waste mass.

FIG. 3 shows an embodiment of the vertical manhole apparatus 10 in which the cables 20 are oriented at different angles relative to the vertical pipe 14 wherein such angles are greater than and/or less than 90° relative to the vertical pipe 14. Preferably, a first group of cables 20A and associated deadman anchors 18A are oriented upward at an angle δ preferably ranging from about 100° to about 160° and a second group of cables 20B and associated deadman anchors 18B are oriented downward at an angle ε preferably ranging from about 20° to about 80°.

Figure 4:
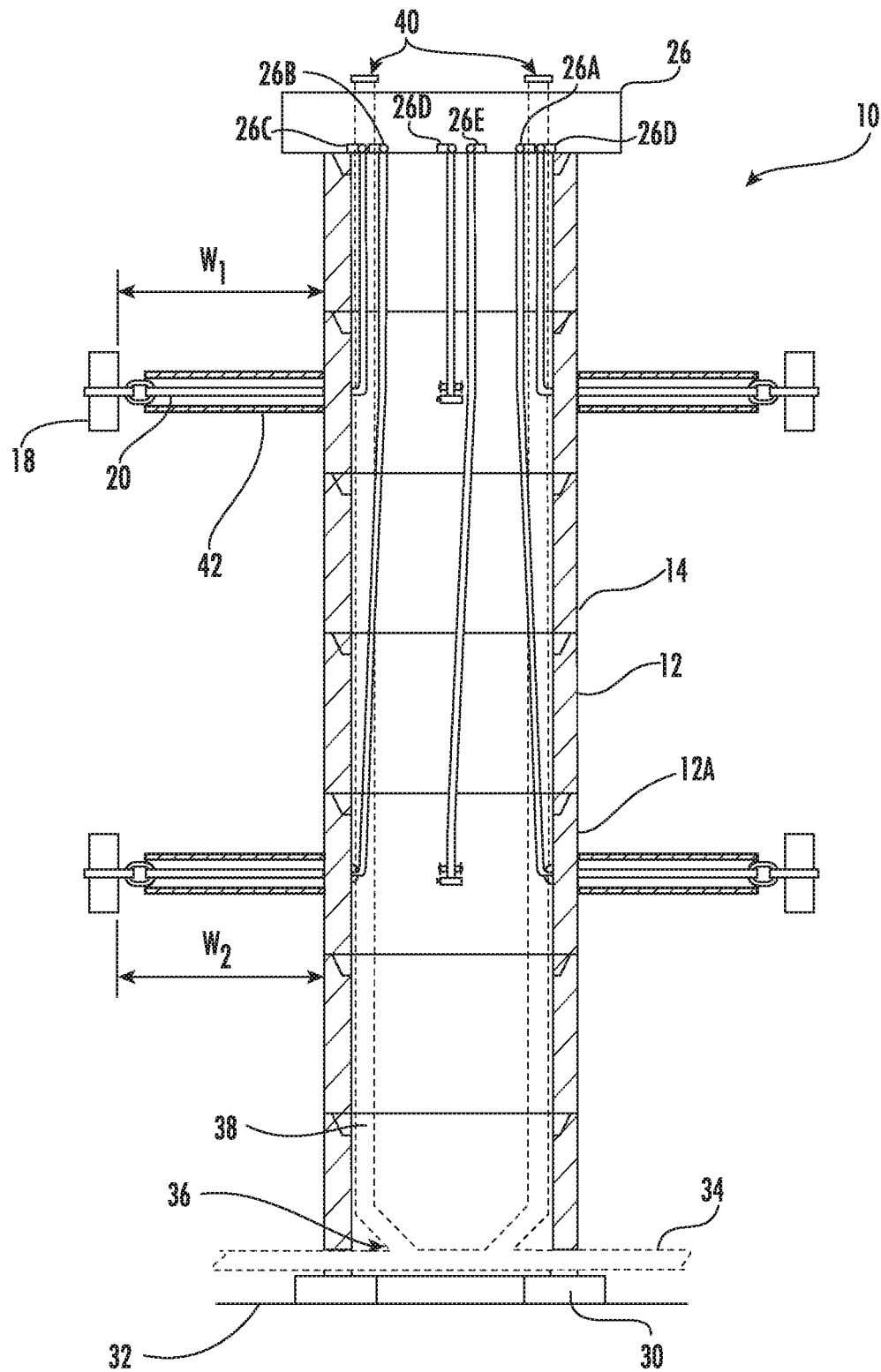
FIG. 4 shows a cutaway profile view of an embodiment of a vertical manhole apparatus that is a variation of the apparatus shown in FIG. 1 wherein the variation includes the adjustable stabilizers incorporate protective sleeves along the cables of the adjustable stabilizer to prevent binding in the waste mass.
Figure 5:
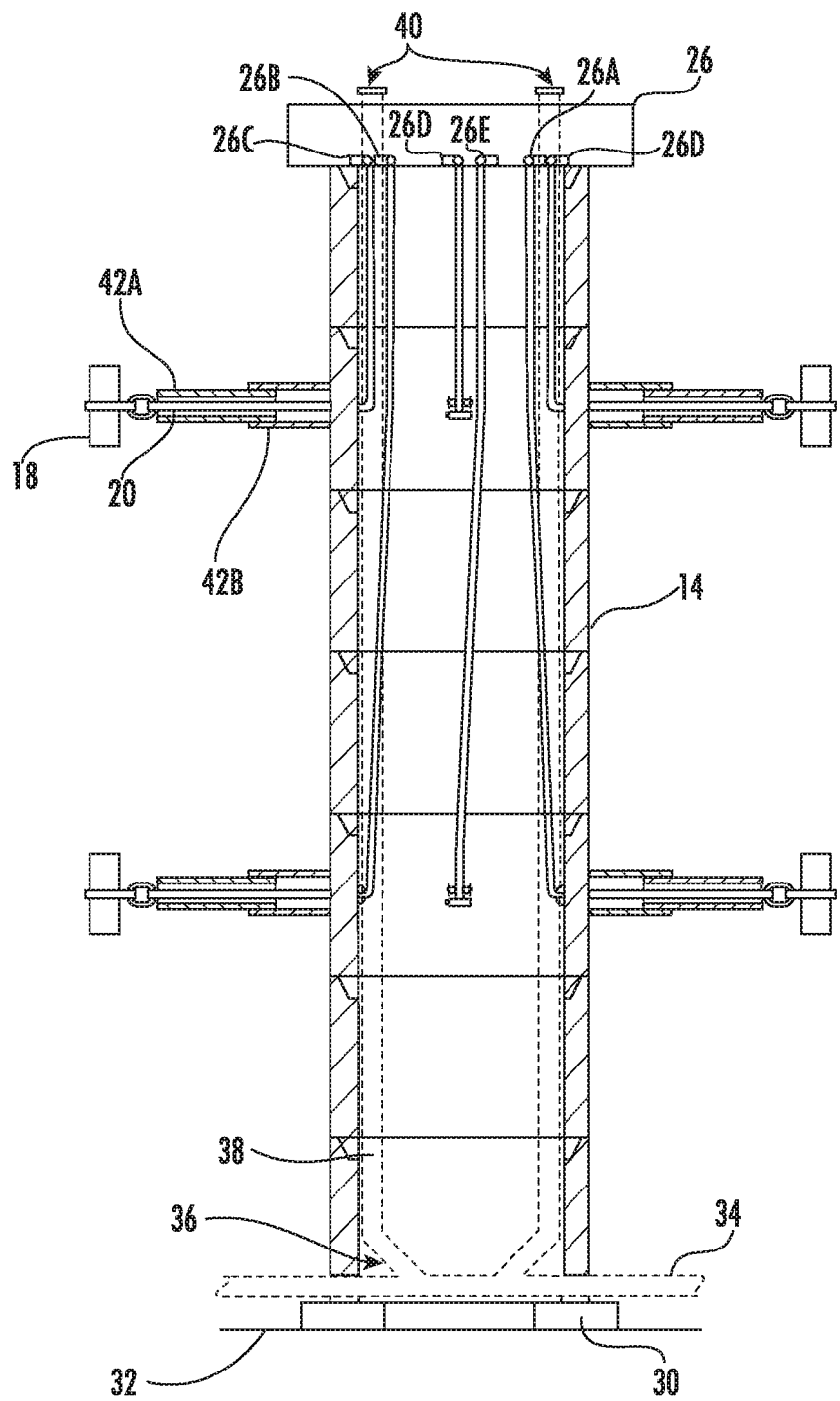
FIG. 5 shows a cutaway profile view of an embodiment of a vertical manhole apparatus that includes a variation of the protective sleeve shown in FIG. 4 wherein such protective sleeves provide more flexibility for tightening or loosening the adjustable stabilizers.

FIG. 4 shows a related embodiment in which protective sleeves 42 are used to protect the cables 20 and allow for the cables 20 to move more freely inside surrounding waste material. The protective sleeves 42 can include, for example, pipes or other similar hollow structures. The protective sleeves 42 protect the cables 20 from being in direct contact with surrounding waste material which could damage the cables 20 and cause undesirable friction to the tensioning efforts of tightening or loosening the cables 20. Preferably, multiple protective sleeves 42 are used along a single cable 20 wherein the multiple protective sleeves 42 are sized differently (i.e., different diameters) so that, for example, a first protective sleeve 42A can slide inside and along a second protective sleeve 42B as shown, for example, in FIG. 5, thereby allowing the cable 20 to be tightened or loosened and still use and maintain the protective sleeves 42 around the cables 20.

Figure 6:
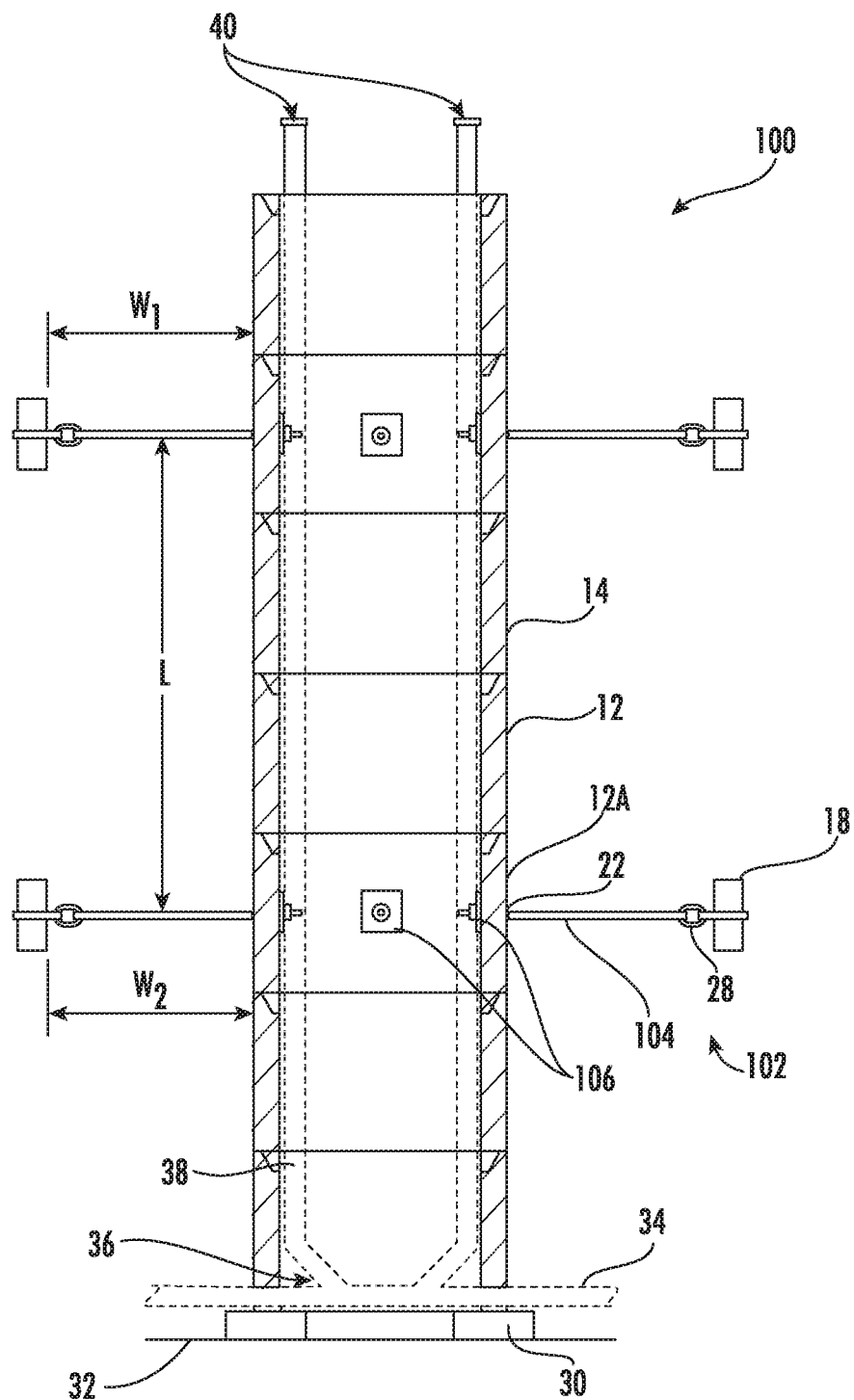
FIG. 6 shows a cutaway profile view of an embodiment of a vertical manhole apparatus as described herein including a vertical pipe including a plurality of pipe segments and non-adjustable stabilizers.

In a related embodiment of a vertical manhole apparatus 100 shown in FIG. 6, non-adjustable stabilizers 102 are used instead of the adjustable stabilizers 16. The non-adjustable stabilizers 102 include cables 104 which extend from deadman anchors 18 to a segment 12A of the vertical pipe 14. The cables 104 do not extend up the length of the vertical pipe 14 but rather terminate at or inside the vertical pipe 14. In some cases the cables 104 terminate after extending through apertures 22. The cables 104 are held in place adjacent to the vertical pipe 14 using a connection apparatus 106. Mechanical means for attaching a cable (e.g., a metal cable) to a wall structure including, for example, a concrete wall, are well known to persons having ordinary skill in the art and are not described in detail here. As such, this disclosure is not intended to be limited by any particular type of connection apparatus 106 shown in FIG. 6.

Figure 7:
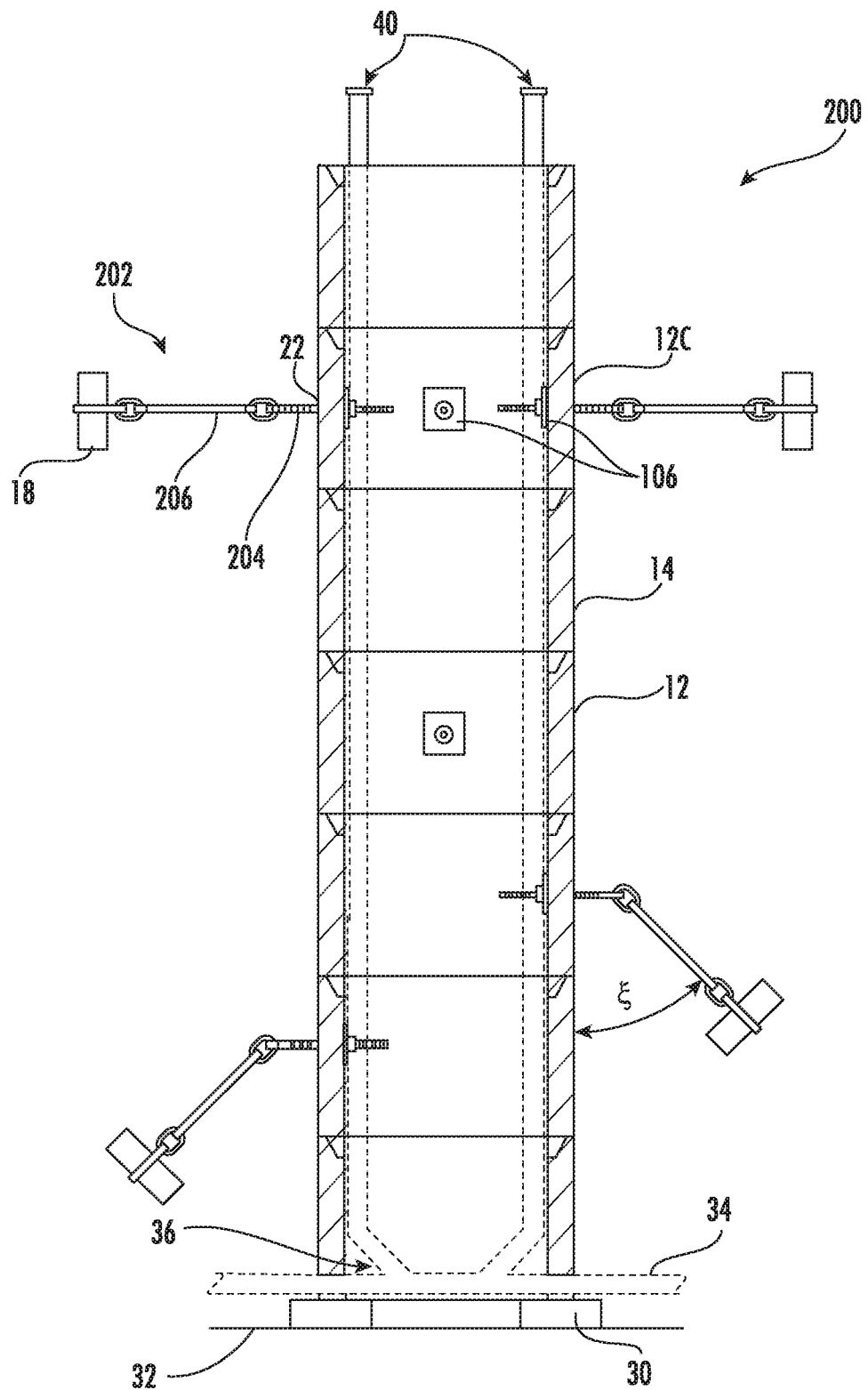
FIG. 7 shows a cutaway profile view of an embodiment of a vertical manhole apparatus that includes a variation of the apparatus shown in FIG. 1 with the addition of adjustable threaded rods extending out from the pipe and connected to cables which extend out to deadman anchors.

FIG. 7 shows an example of a vertical manhole apparatus 200 including stabilizers 202. The stabilizers 202 include rods 204 extending through apertures 22 in a segment 12C of a vertical pipe 14 wherein the rods 204 are connected to the vertical pipe 14. Preferably, the rods 204 are threaded at least in part and can be adjusted to extend out of the vertical pipe 14 further or to retract into the vertical pipe 14 further depending on which direction the rods 204 are rotated. The stabilizers 202 preferably further include cables 206 which are attached to the rods 204 at proximal ends of the cables 206 and that extend out having deadman anchors 18 attached to the cables 206 at distal ends of the cables 206. The deadman anchors can extend out at various angles ζ.

Figure 8:
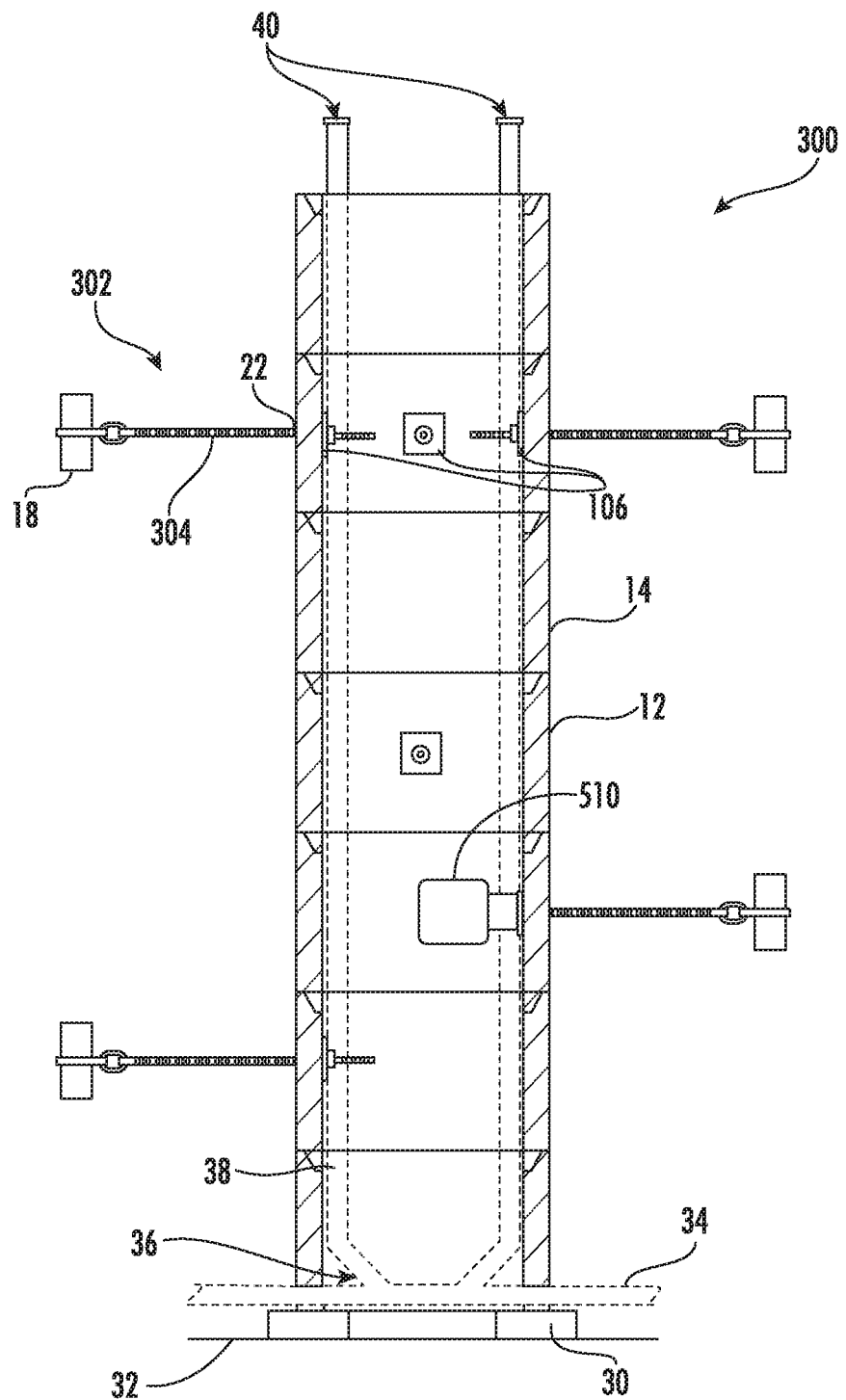
FIG. 8 shows a cutaway profile view of an embodiment of a vertical manhole apparatus that includes a variation of the apparatus shown in FIG. 1 with threaded poles used instead of cables.

In a similar embodiment shown in FIG. 8, a vertical manhole apparatus 300 is shown in which stabilizers 302 are used which include poles 304 connected to a vertical pipe 14 of the manhole apparatus 300. The poles 304 extend out from the vertical pipe 14 and can, in some embodiments, include deadman anchors 18 attached to distal ends of the poles 304. However, versions of the vertical manhole apparatus 300 are contemplated that do not include deadman anchors 18 attached to the poles 304. The poles 304 are preferably threaded at least along some length of the poles 304 so that the poles 304 can be screwed farther out or farther into the vertical pipe 14, thereby allowing a way to adjust the poles 304 and, in some embodiments, the deadman anchors 18.

Figure 9:
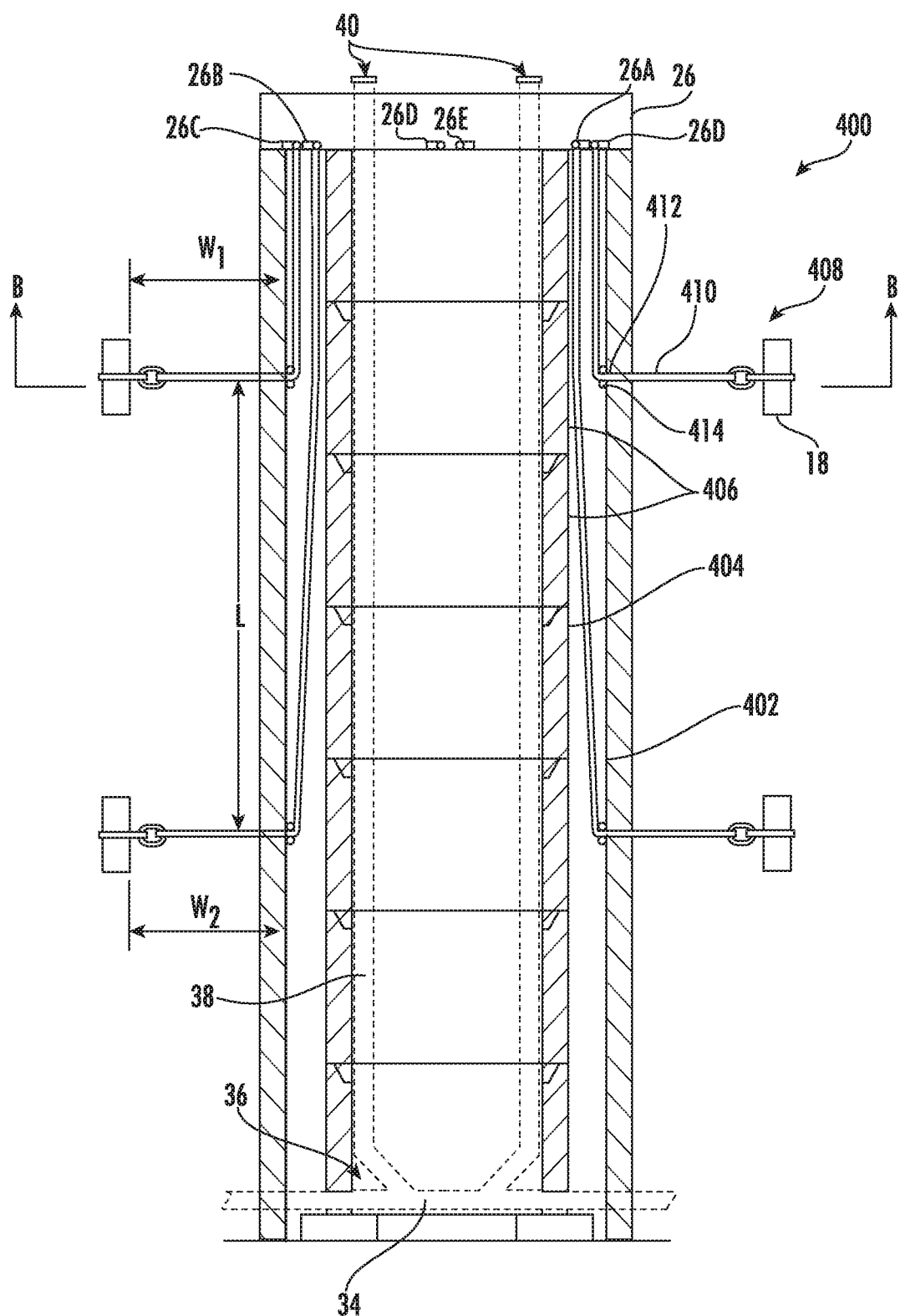
FIG. 9 shows a cutaway profile view of an embodiment of a vertical manhole apparatus that includes a variation of the apparatus shown in FIG. 1 with the addition of a second vertical pipe such that the outer vertical pipe helps protect the inner vertical pipe.
Figure 10:
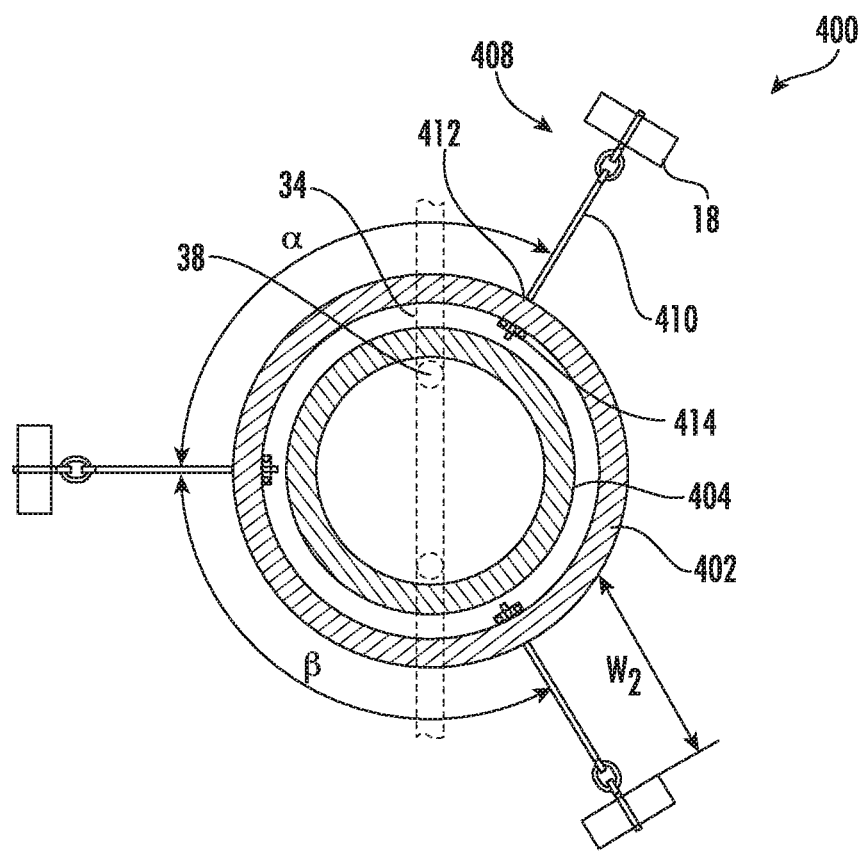
FIG. 10 shows the apparatus from FIG. 9 cut along line B-B.

A different vertical manhole apparatus 400 is shown in FIGS. 9 and 10 which includes an outer wall 402 and an inner pipe 404 including pipe segments 406. FIG. 10 shows a top plan view of the vertical manhole apparatus 400 cut at line B-B in FIG. 9. The vertical manhole apparatus 400 is similar to the vertical manhole apparatus 10 shown in FIG. 1 in that the vertical manhole apparatus 400 also includes adjustable stabilizers 408 that include cables 410 which extend out to deadman anchors 18 at distal ends of the cables 410. Proximal ends of the cables 410 extend up to a tension control system 26. In contrast with the embodiments shown in FIG. 1, embodiments shown in FIGS. 9 and 10 include the addition of the outer wall 402. The tension control system 26 and associated adjustable stabilizers 408 of the vertical manhole apparatus 400 operate in an area outside the inner pipe 404. The outer wall 402 can be adjusted by the tension control system 26 while the inner pipe 404 remains in a set location, protected by the extra layer provided by the outer wall 402. One or more cleanout riser pipes 38 extend inside the protected inner pipe 404 down to a leachate collection pipe access point 36 where it interfaces with a leachate collection pipe 34. The cables 410 extend through apertures 412 in the outer wall 402. Each aperture 412 preferably includes a cable roller 414 or other similar feature adjacent thereto on which cables 410 can slide or roll.

Figure 11:
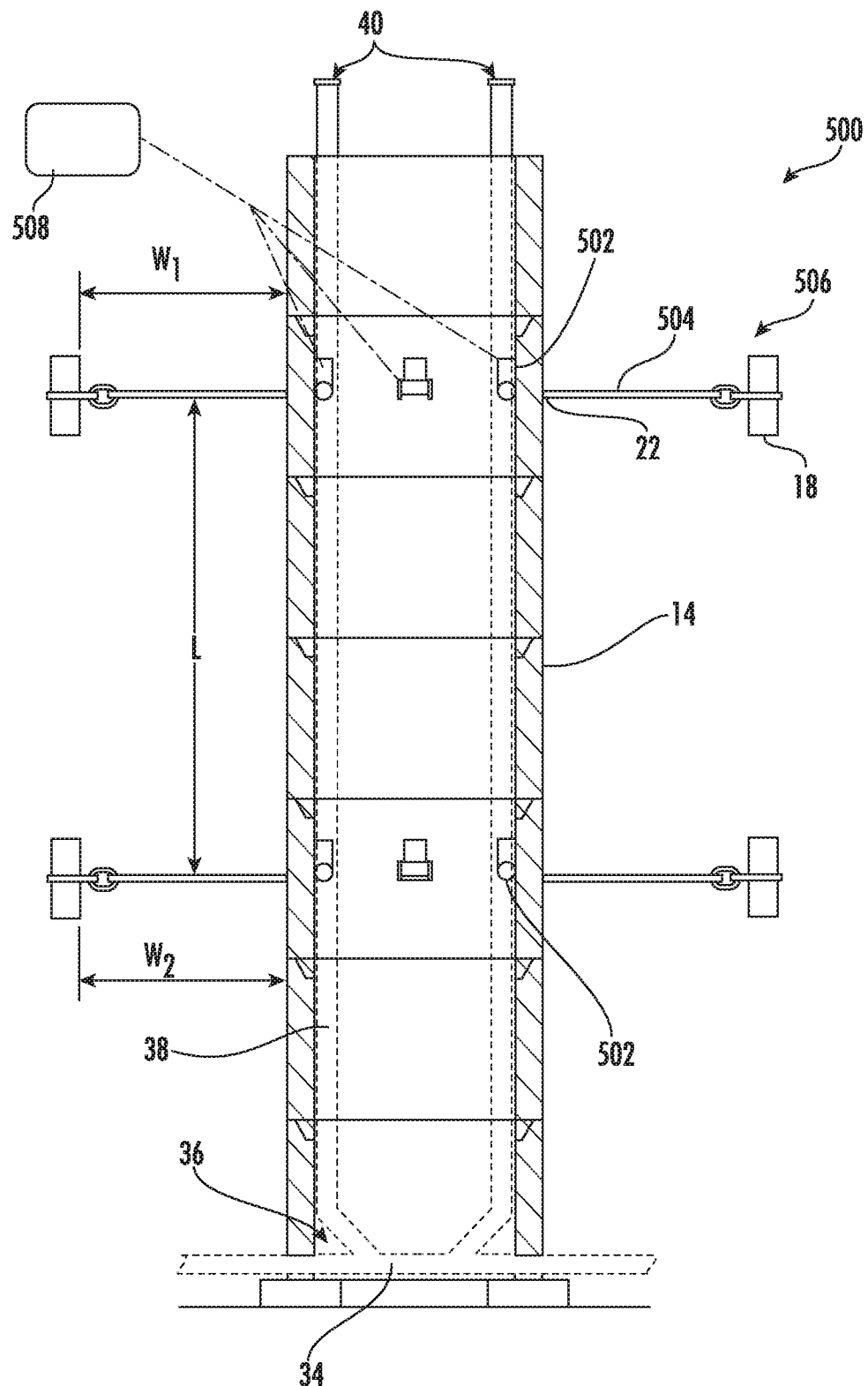
FIG. 11 shows a cutaway profile view of an embodiment of a vertical manhole apparatus that includes a variation of the apparatus shown in FIG. 1 with the tensioning devices located within the vertical pipe.

FIG. 11 shows a vertical manhole apparatus 500 in which one or more tensioning devices 502 are located inside a vertical pipe 14. The example shown in FIG. 11 is similar to the embodiment described above with respect to FIG. 1 except for the location of the tensioning component(s) of the overall apparatus. In the example shown in FIG. 11, by placing tensioning devices 502 inside the vertical pipe 14 adjacent to apertures 22 through which cables 504 extend, vertical forces imparted by the cables 504 on the vertical pipe 14 are minimized which in turn reduces the required force and shorter cables may be used to align the vertical pipe. Another benefit of this different configuration is that the tension between the vertical pipe 14 and the deadman anchors 18 attached at the distal ends of the cables 504 can be directly and more accurately measured. Examples of a tensioning device 502 that can be used for this purpose includes hydraulic or electronic winches. The cables 504 and deadman anchors 18 form at least part of adjustable stabilizers 506. The one or more tensioning devices 502 are preferably hardwired to a control device 508 or a transmitter in wireless communication with the control device 508 which controls the tensioning devices 502. Although the use of cables 504 is shown in FIG. 11 wherein the one or more tensioning devices 502 include one or more winches, other tensioning devices and other types of adjustable stabilizers are contemplated including, for example, a motor 510 to drive or retract a threaded rod 204 shown for example in FIG. 8 wherein the motor 510 preferably includes a linear actuator stepper motor. Multiple motors can be used, one per rod 204, and each can be manipulated or otherwise controlled independent of the others. Generally speaking, the one or more tensioning devices are used to manipulate the orientation of the vertical pipe. The tensioning devices described herein can be manual or motorized and can be controlled directly or remotely using control and wireless technology known to persons having ordinary skill in the art.

Figure 12:
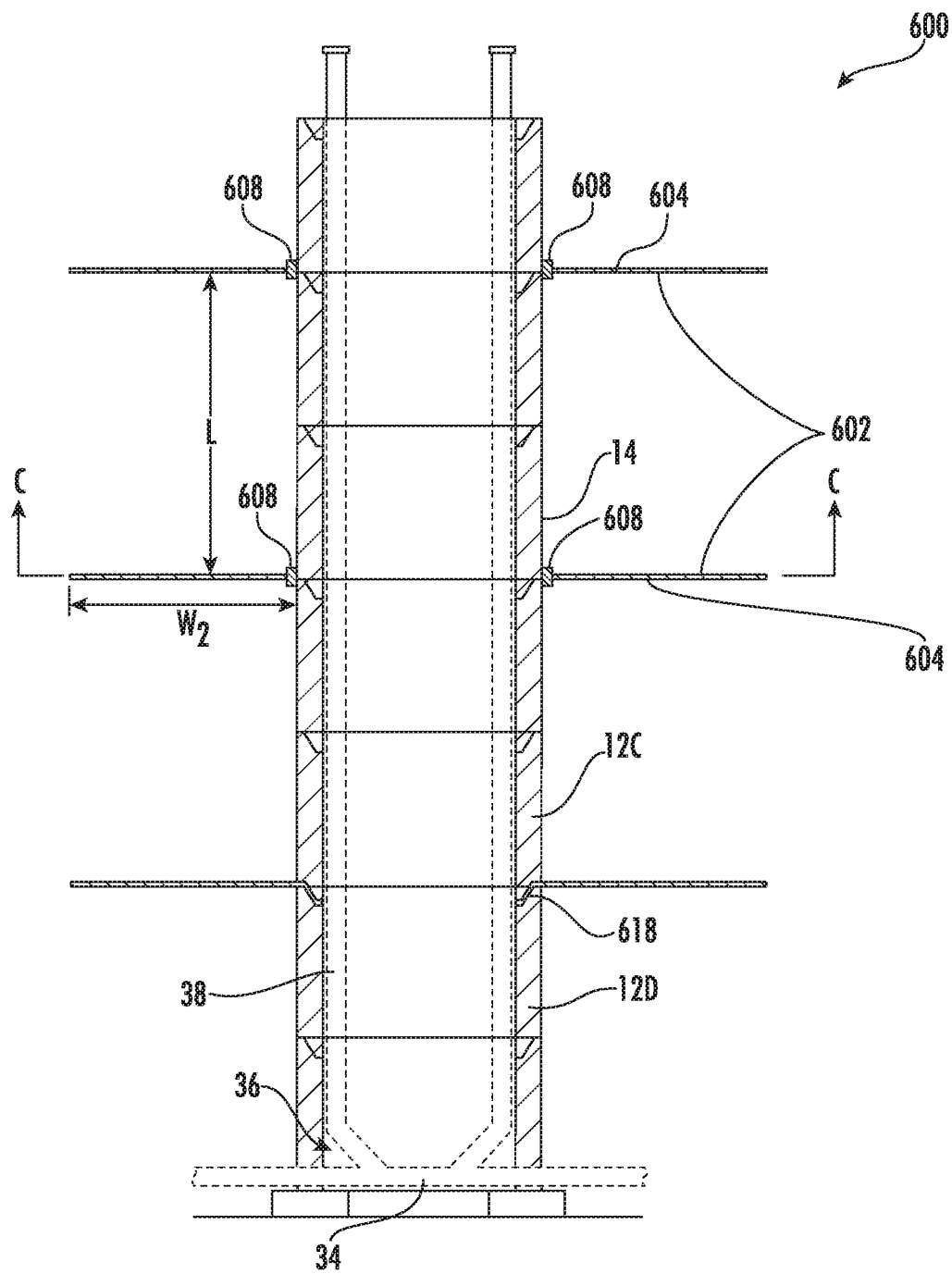
FIG. 12 shows a a cutaway profile view of an embodiment of a vertical manhole apparatus that includes a variation of the apparatus shown in FIG. 1 with the tension control system replaced by one or more geomats extending out from the vertical pipe.
Figure 13:
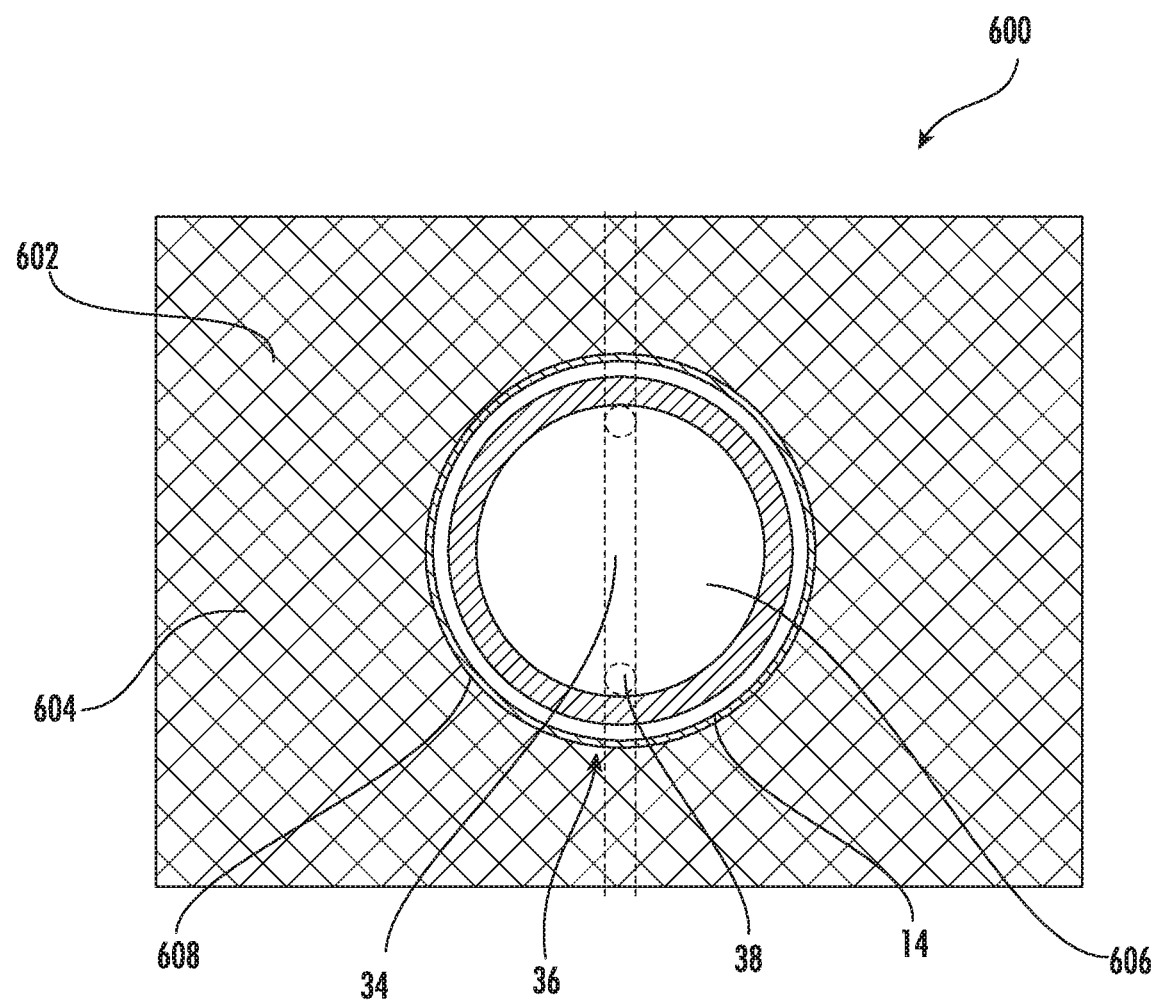
FIG. 13 shows the apparatus from FIG. 12 cut along line C-C.

Certain components that can be used in addition to or instead of adjustable stabilizers are geomats. FIGS. 12 and 13 show a vertical manhole apparatus 600 which is held steady in a landfill waste area by one or more geomats 602 attached along a vertical pipe 14. These geomats 602 stabilize the waste located around the manhole apparatus 600. In a preferred embodiment, each geomat includes a skirt 604 which fans outward from an aperture 606. The skirt 604 is defined as a substantially planar section of material that is preferably made of plastic or metal mesh material (or a combination thereof). Geomats 602 can be attached directly to the vertical pipe 14 via anchors, between sections (held in place by pressure between sections), or other attachment means known to persons having ordinary skill in the art) or can be slidably engaged with the vertical pipe 14.

Figure 14:
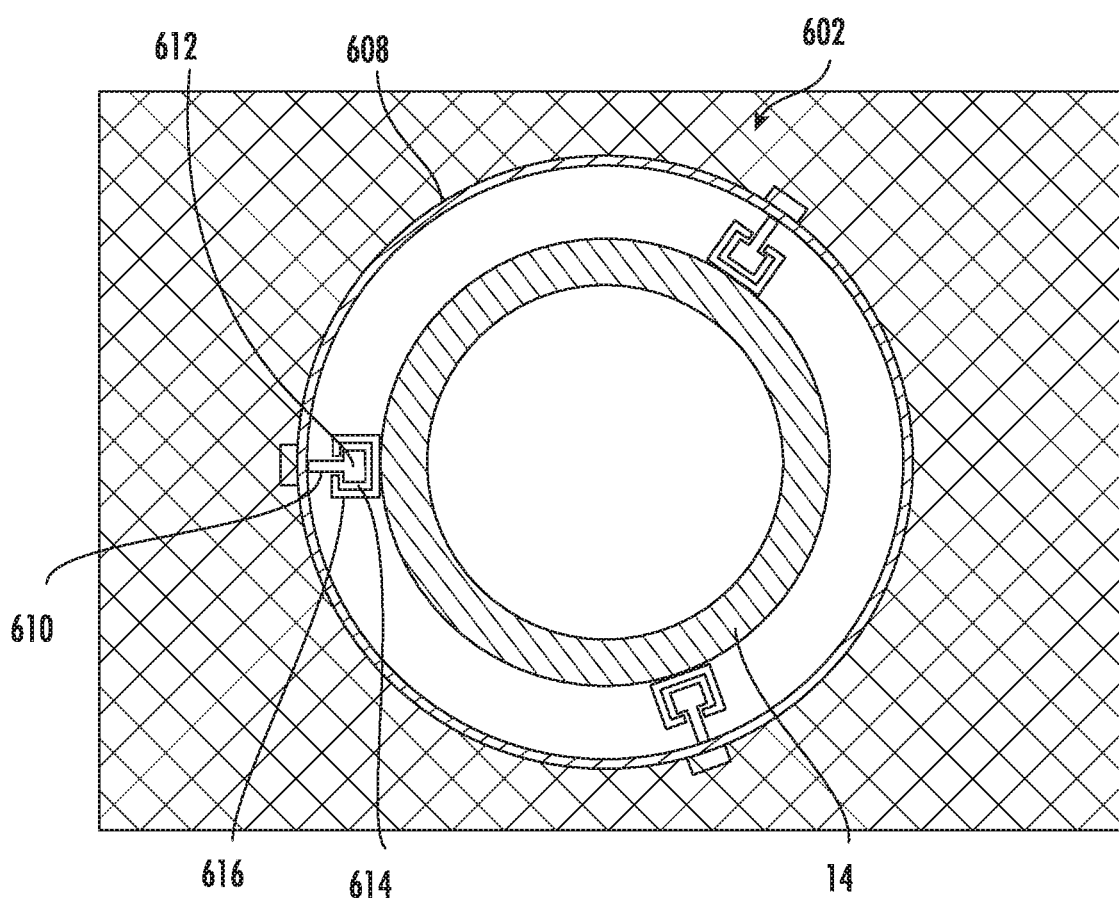
FIG. 14 shows a variation of how a geomat is movably attached to the vertical pipe shown in FIG. 12.

In FIGS. 12 and 13, geomats 602 are engaged along the vertical pipe 14 by rings 608 which are slightly wider than the outer diameter of the vertical pipe 14, thereby allowing each ring 608 to move up and down along the vertical pipe 14 as waste shifts in the landfill. As the geomats 602 shift, they continue to apply pressure to the sides of the vertical pipe 14, thereby resisting horizontal forces on the vertical pipe 14. In this way geomats 602 are said to be "engaged with" the vertical pipe 14 even though such geomats 602 may not be directly attached to or otherwise connected directly to the vertical pipe 14. Each ring defines an aperture 606. The rings 608 are preferably made of metal or plastic but can be made from other materials known to persons having ordinary skill in the art. The rings 608 are attached to the skirts 604 by clamps, wrapped wire, ties or other attachment means known to persons having ordinary skill in the art. In some embodiments shown, for example, in FIG. 14, the rings 608 include appendages 610 with enlarged ends 612 wherein such appendages 610 extend inward toward the vertical pipe 14. The appendages 610 preferably are configured to slide along slots 614 defined along the edge of the vertical pipe 14 inside rails 616.

Although one specific example of geomats 602 is shown in FIGS. 12 and 13, geomats can come in many different shapes and do not all include an aperture 606 or a ring 608. In different embodiments, different shaped geomats can be attached to the vertical pipe 14 extending outward therefrom and providing increased stability for the waste around the vertical pipe 14, thereby providing increased stability to the vertical pipe 14. In one preferred embodiment, one or more geomats are attached to the vertical pipe 14 by pinning a portion (e.g., an edge 618) of a geomat or geomats between a first section 12C and a second section 12D of the vertical pipe 14 so that the geomat(s) is/are firmly attached to the vertical pipe 14, held in place by the weight of and pressure between the first section 12C and the second section 12D of the vertical pipe 14.

Figure 15:
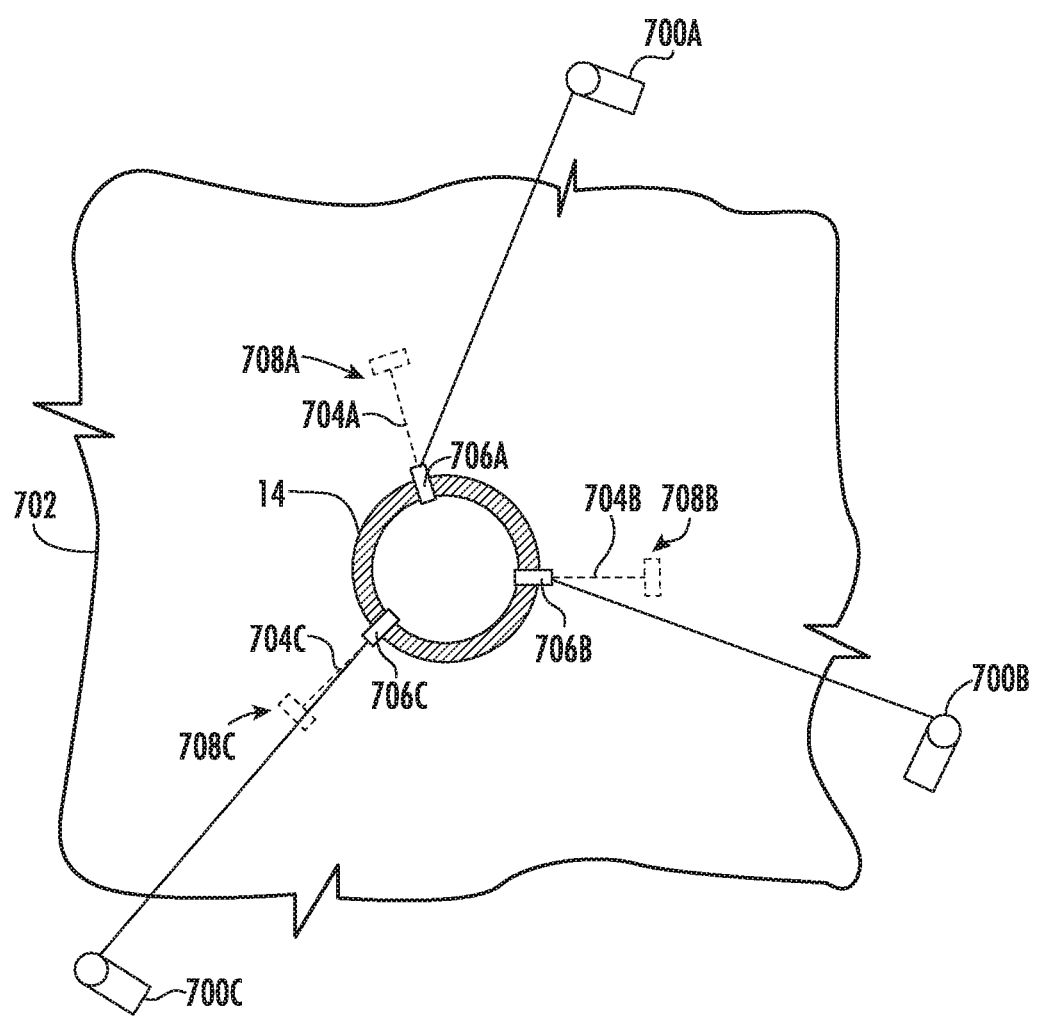
FIG. 15 shows a plan view of an embodiment of a vertical manhole apparatus that includes a variation of the apparatus shown in FIG. 1 situated inside a waste storage mass wherein a plurality of tension control devices are located outside the waste storage mass for controlling adjustable stabilizers from outside the waste storage mass The figures are provided to illustrate concepts of the invention disclosure and are not intended to embody all potential embodiments of the invention. Therefore, the figures are not intended to limit the scope of the invention disclosure in any way, a function which is reserved for the appended claims.

Although tensioning devices described herein such as the tension control system 26 and the tensioning devices 502 are described as being on or in the vertical pipe 14 of the overall manhole apparatus, other embodiments are contemplated in which tension control devices are located elsewhere including, for example, tension control devices 700A, 700B, and 700C shown in FIG. 15 located adjacent to the edge of a landfill 702 (or otherwise not in the landfill waste itself). When cables are used (e.g., cables 704A, 704B, and 704C), pulley components (706A, 706B, and 706C) known to persons having ordinary skill in the art can be employed to direct the cables 704 in different orientations and to help control tension on adjustable stabilizers (708A, 708B, and 708C) from outside the landfill waste area wherein such adjustable stabilizers are the same or similar to adjustable stabilizers 16 shown in FIG. 1 and FIG. 2.

Other embodiments are contemplated in which cables, rods, poles, or other devices forming part of adjustable stabilizers extend to and, in some cases, beyond the edges of a landfill waste area so that the manhole apparatus is anchored to solid ground outside the landfill waste area.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A vertical manhole apparatus for providing access to one or more leachate collection pipe access points, the apparatus comprising:
   a plurality of first pipe segments joined together vertically above a foundation in a landfill including a first pipe first segment wherein the plurality of first pipe segments form a first vertical pipe;
   a cleanout riser pipe extending inside the first vertical pipe from a cleanout riser pipe access point to a collection pipe access point providing access to a horizontally oriented leachate collection pipe; and a first stabilizer engaged with the first pipe first segment and extending from the first pipe first segment out into waste in the landfill, the first stabilizer further comprising a first rod connected to the first pipe first segment, a first cable connected to the first rod and a first deadman anchor connected to the first cable.

2. A vertical manhole apparatus for providing access to one or more leachate collection pipe access points, the apparatus comprising:

a plurality of first pipe segments joined together vertically above a foundation in a landfill including a first pipe first segment wherein the plurality of first pipe segments form a first vertical pipe;

a cleanout riser pipe extending inside the first vertical pipe from a cleanout riser pipe access point to a collection pipe access point providing access to a horizontally oriented leachate collection pipe;

a first stabilizer engaged with the first pipe first segment and extending from the first pipe first segment out into waste in the landfill, the first stabilizer further comprising a first rod connected to the first pipe first segment, a first cable connected to the first rod and a first deadman anchor connected to the first cable;

a second stabilizer engaged with the first pipe first segment and extending from the first pipe first segment, the second stabilizer further comprising a second rod connected to the first pipe first segment, second cable connected to the second rod and a second deadman anchor connected to the second cable; and a third stabilizer engaged with the first pipe first segment and extending from the first pipe first segment, the third stabilizer further comprising a third rod connected to the first pipe first segment, a third cable connected to the third rod and a third deadman anchor connected to the third cable.

3. A vertical manhole apparatus for providing access to one or more leachate collection pipe access points, the apparatus comprising:

a plurality of first pipe segments joined together vertically above a foundation in a landfill including a first pipe first segment wherein the plurality of first pipe segments form a first vertical pipe;

a cleanout riser pipe extending inside the first vertical pipe from a cleanout riser pipe access point to a collection pipe access point proximate a horizontally oriented leachate collection pipe;

a first stabilizer engaged with the first pipe first segment and extending from the first pipe first segment out into waste in the landfill; and a tension control system wherein the first stabilizer further comprises a first cable connected to a first deadman anchor at a proximal end of the first cable and the tension control system at a distal end of the first cable and wherein the tension control system controls the tension of the first cable by increasing or decreasing the tension of the first cable between the tension control system and the first deadman anchor.

4. The vertical manhole apparatus of claim 3 further comprising:

a second stabilizer engaged with the first pipe first segment and extending from the first pipe first segment; and a third stabilizer engaged with the first pipe first segment and extending from the first pipe first segment; and the tension control system wherein (a) the second stabilizer further comprises a second cable connected to a second deadman anchor at a proximal end of the second cable and the tension control system at a distal end of the second cable, and (b) the third stabilizer further comprises a third cable connected to a third deadman anchor at a proximal end of the first cable and the tension control system at a distal end of the first cable and wherein (1) the tension control system controls the tension of the second cable by increasing or decreasing the tension of the second cable between the tension control system and the second deadman anchor, and (2) the tension control system controls the tension of the third cable by increasing or decreasing the tension of the third cable between the tension control system and the third deadman anchor.

5. The vertical manhole apparatus of claim 3 wherein the tension control system further comprises a first winch located inside the first vertical pipe adjacent to an aperture in the first vertical pipe through which the first cable extends.

6. The vertical manhole apparatus of claim 5 further comprising a control device for controlling the first winch wherein the control device is in communication with the first winch but wherein the control device is remote from the first winch.

7. The vertical manhole apparatus of claim 4 wherein the tension control system further comprises a first winch, a second winch, and a third winch and wherein the first winch is located inside the first vertical pipe adjacent to a first aperture in the first vertical pipe through which the first cable extends, wherein the second winch is located inside the first vertical pipe adjacent to a second aperture in the first vertical pipe through which the second cable extends, and wherein the third winch is located inside the first vertical pipe adjacent to a third aperture in the first vertical pipe through which the third cable extends.

8. The vertical manhole apparatus of claim 3 wherein the tension control system further comprises a winch located adjacent to an edge of waste from the landfill.

9. The vertical manhole apparatus of claim 4 wherein the tension control system further comprises a plurality of winches located adjacent to an edge of waste from the landfill.

* * * * *